(12) United States Patent
Gebeyehu

(10) Patent No.: US 12,494,753 B2
(45) Date of Patent: Dec. 9, 2025

(54) APPARATUS AND METHODS FOR DETECTING AND CLAMPING POWER OF A POWER AMPLIFIER

(71) Applicant: Skyworks Solutions, Inc., Irvine, CA (US)

(72) Inventor: Netsanet Gebeyehu, San Jose, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 705 days.

(21) Appl. No.: 17/816,066

(22) Filed: Jul. 29, 2022

(65) Prior Publication Data
US 2023/0079623 A1 Mar. 16, 2023

Related U.S. Application Data

(60) Provisional application No. 63/261,163, filed on Sep. 14, 2021.

(51) Int. Cl.
*H03F 3/24* (2006.01)
*H03F 3/195* (2006.01)
*H04B 1/04* (2006.01)

(52) U.S. Cl.
CPC .......... *H03F 3/245* (2013.01); *H03F 3/195* (2013.01); *H04B 1/0475* (2013.01); *H03F 2200/105* (2013.01); *H03F 2200/441* (2013.01); *H03F 2200/451* (2013.01); *H04B 2001/0408* (2013.01)

(58) Field of Classification Search
CPC .... H03F 3/245; H03F 3/195; H03F 2200/105; H03F 2200/441; H03F 2200/451; H04B 1/0475; H04B 2001/0408

USPC ..................................................... 455/127.1
See application file for complete search history.

(56) References Cited

U.S. PATENT DOCUMENTS

| | | | |
|---|---|---|---|
| 6,580,321 B1 | 6/2003 | Arell et al. | |
| 6,822,511 B1 | 11/2004 | Doherty et al. | |
| 6,825,725 B1 | 11/2004 | Doherty et al. | |
| 6,882,220 B2 | 4/2005 | Doherty et al. | |
| 6,917,243 B2 | 7/2005 | Doherty et al. | |
| 7,142,053 B2 | 11/2006 | Phillips et al. | |
| 7,193,474 B2 | 3/2007 | Phillips et al. | |
| 7,983,624 B2 * | 7/2011 | Knecht | H04B 1/40 455/73 |
| 8,362,840 B2 * | 1/2013 | Andrys | H03F 1/0261 330/289 |
| 8,648,661 B1 * | 2/2014 | Dolin | H03F 3/24 330/279 |
| 9,093,969 B2 * | 7/2015 | Gebeyehu | H03G 3/30 |
| 9,602,060 B2 * | 3/2017 | Gorbachov | H03F 1/0266 |
| 9,673,853 B2 * | 6/2017 | Blum | H03F 1/0272 |

(Continued)

*Primary Examiner* — April G Gonzales
(74) *Attorney, Agent, or Firm* — Knobbe, Martens, Olson & Bear, LLP

(57) ABSTRACT

Apparatus and method for detecting and clamping power of a power amplifier are disclosed. In certain embodiments, a power amplifier system includes a power amplifier that amplifies a radio frequency input signal to generate a radio frequency output signal, a bias circuit that controls a bias of the power amplifier, a radio frequency coupler that generates a radio frequency coupled signal based on the radio frequency output signal, a clamp that selectively clamps the bias of the power amplifier, and a power detector that controls the clamp based on the radio frequency coupled signal.

20 Claims, 12 Drawing Sheets

(56) References Cited

U.S. PATENT DOCUMENTS

| | | | | |
|---|---|---|---|---|
| 9,755,587 | B1* | 9/2017 | Arell | H03G 7/00 |
| 10,084,417 | B2* | 9/2018 | Blum | H03F 1/0205 |
| 10,177,721 | B2* | 1/2019 | Arell | H03F 3/193 |
| 10,211,197 | B2* | 2/2019 | Quaglietta | H10D 10/421 |
| 10,284,153 | B2* | 5/2019 | Quaglietta | H03F 1/52 |
| 10,505,501 | B2* | 12/2019 | Gorbachov | H03G 3/3042 |
| 10,643,962 | B1* | 5/2020 | Ichitsubo | H03F 3/72 |
| 11,233,486 | B2* | 1/2022 | Park | H10D 89/811 |
| 2015/0015339 | A1* | 1/2015 | Gorbachov | H03G 3/3042 |
| | | | | 330/291 |
| 2018/0226367 | A1* | 8/2018 | Babcock | H01L 23/66 |
| 2019/0013196 | A1* | 1/2019 | Roberts | H01L 21/02458 |
| 2019/0267953 | A1* | 8/2019 | Arell | H03F 3/193 |
| 2020/0127614 | A1* | 4/2020 | Quaglietta | H03F 1/52 |
| 2023/0327609 | A1* | 10/2023 | Gebeyehu | H03F 1/0261 |
| | | | | 330/75 |

\* cited by examiner

APPARATUS AND METHODS FOR DETECTING AND CLAMPING POWER OF A POWER AMPLIFIER

CROSS-REFERENCE TO RELATED APPLICATIONS

This application claims the benefit of priority under 35 U.S.C. § 119 of U.S. Provisional Patent Application No. 63/261,163, filed Sep. 14, 2021 and titled "APPARATUS AND METHODS FOR DETECTING AND CLAMPING POWER OF A POWER AMPLIFIER," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about such as in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a mobile device. The mobile device includes a transceiver configured to generate a radio frequency input signal, and a front-end system including a power amplifier configured to amplify the radio frequency input signal to generate a radio frequency output signal, a bias circuit configured to control a bias of the power amplifier, a radio frequency coupler configured to generate a radio frequency coupled signal based on the radio frequency output signal, a clamp configured to selectively clamp the bias of the power amplifier, and a power detector configured to control the clamp based on the radio frequency coupled signal.

In some embodiments, the mobile device further includes an acoustic wave filter electrically connected to an output of the power amplifier.

In various embodiments, the mobile device includes a bias control circuit configured to generate a threshold voltage, the power detector configured to generate a DC power signal based on the radio frequency coupled signal, and to control the clamp based on comparing the DC power signal to the threshold signal.

According to a number of embodiments, the power detector includes a diode configured to generate a rectified signal based on the radio frequency coupled signal, and a low pass filter configured to generate the DC power signal based on low pass filtering the rectified signal. In accordance with several embodiments, at least one of a resistance of the low pass filter or a capacitance of the low pass filter is controlled by the bias control circuit.

According to some embodiments, the bias control circuit is further configured to generate a reference current for the bias circuit.

In accordance with several embodiments, the bias control circuit is further configured to control the threshold voltage to account for process, voltage, and/or temperature variation.

According to a number of embodiments, the bias control circuit is further configured to control the threshold voltage to account for a frequency band of the radio frequency input signal.

In accordance with various embodiments, the bias control circuit is further configured to control the threshold voltage to account for a mode of the power amplifier.

In certain embodiments, a power amplifier system includes a power amplifier configured to amplify a radio frequency input signal to generate a radio frequency output signal, a bias circuit configured to control a bias of the power amplifier, a radio frequency coupler configured to generate a radio frequency coupled signal based on the radio frequency output signal, a clamp configured to selectively clamp the bias of the power amplifier, and a power detector configured to control the clamp based on the radio frequency coupled signal.

In some embodiments, the power amplifier system further includes a bias control circuit configured to generate a threshold voltage, the power detector configured to generate a DC power signal based on the radio frequency coupled signal, and to control the clamp based on comparing the DC power signal to the threshold signal. According to a number of embodiments, the power detector includes a diode configured to generate a rectified signal based on the radio frequency coupled signal, and a low pass filter configured to generate the DC power signal based on low pass filtering the rectified signal.

In accordance with several embodiments, at least one of a resistance of the low pass filter or a capacitance of the low pass filter is controlled by the bias control circuit.

In various embodiments, the bias control circuit is further configured to generate a reference current for the bias circuit.

In several embodiments, the bias control circuit is further configured to control the threshold voltage to account for process, voltage, and/or temperature variation.

In some embodiments, the bias control circuit is further configured to control the threshold voltage to account for a frequency band of the radio frequency input signal.

In various embodiments, the bias control circuit is further configured to control the threshold voltage to account for a mode of the power amplifier.

In certain embodiments, a method of power detection and limiting in a power amplifier system is disclosed. The method includes amplifying a radio frequency input signal to generate a radio frequency output signal using a power amplifier, controlling a bias of the power amplifier using a bias circuit, generating a radio frequency coupled signal based on the radio frequency output signal using a radio frequency coupler, selectively clamping the bias of the power amplifier using a clamp, and controlling the clamp based on the radio frequency coupled signal using a power detector.

In various embodiments, the method further includes generating a DC power signal based on the radio frequency coupled signal using the power detector, and controlling the clamp based on comparing the DC power signal to a threshold signal.

In several embodiments, the method further includes processing the radio frequency coupled signal to generate an observation signal using an observation receiver, and processing the observation signal to provide at least one of digital pre-distortion or power control to the radio frequency input signal.

DETAILED DESCRIPTION OF EMBODIMENTS

Figure 1:
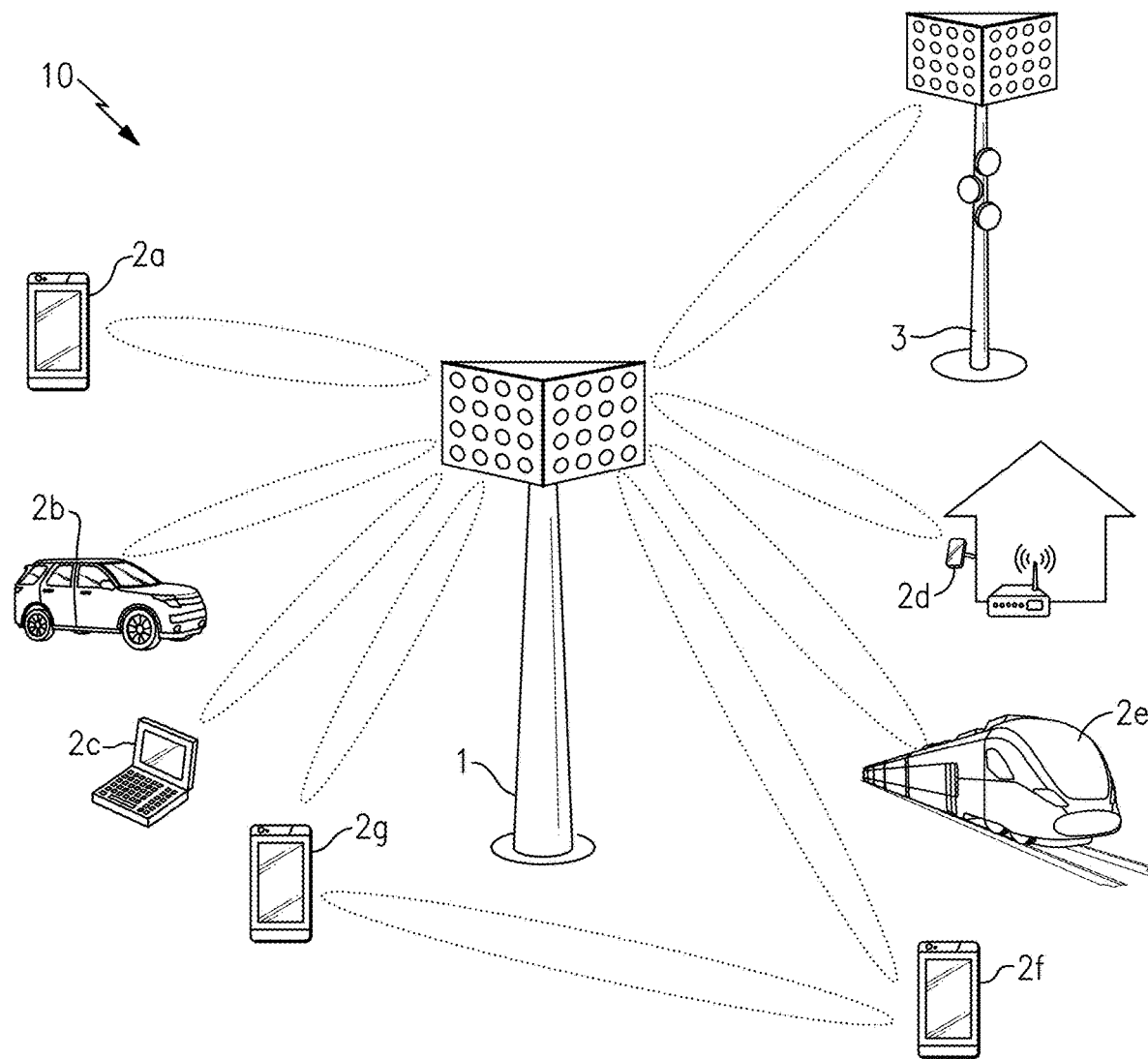
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2019). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

In certain implementations, the communication network 10 supports supplementary uplink (SUL) and/or supplementary downlink (SDL). For example, when channel conditions are good, the communication network 10 can direct a particular UE to transmit using an original uplink frequency, while when channel condition is poor (for instance, below a certain criteria) the communication network 10 can direct the UE to transmit using a supplementary uplink frequency that is lower than the original uplink frequency. Since cell coverage increases with lower frequency, communication range and/or signal-to-noise ratio (SNR) can be increased using SUL. Likewise, SDL can be used to transmit using an original downlink frequency when channel conditions are good, and to transmit using a supplementary downlink frequency when channel conditions are poor.

Figure 2A:
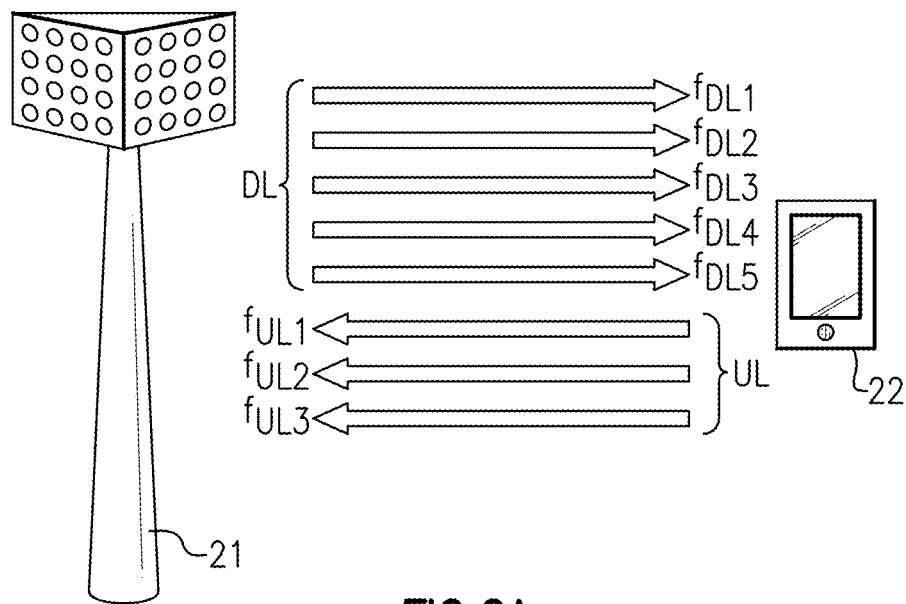
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
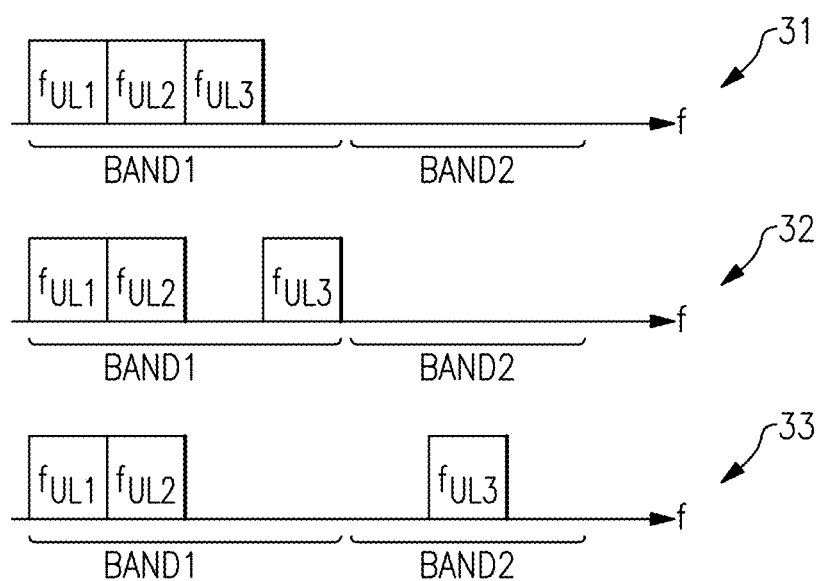
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intraband contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-contiguous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates interband non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
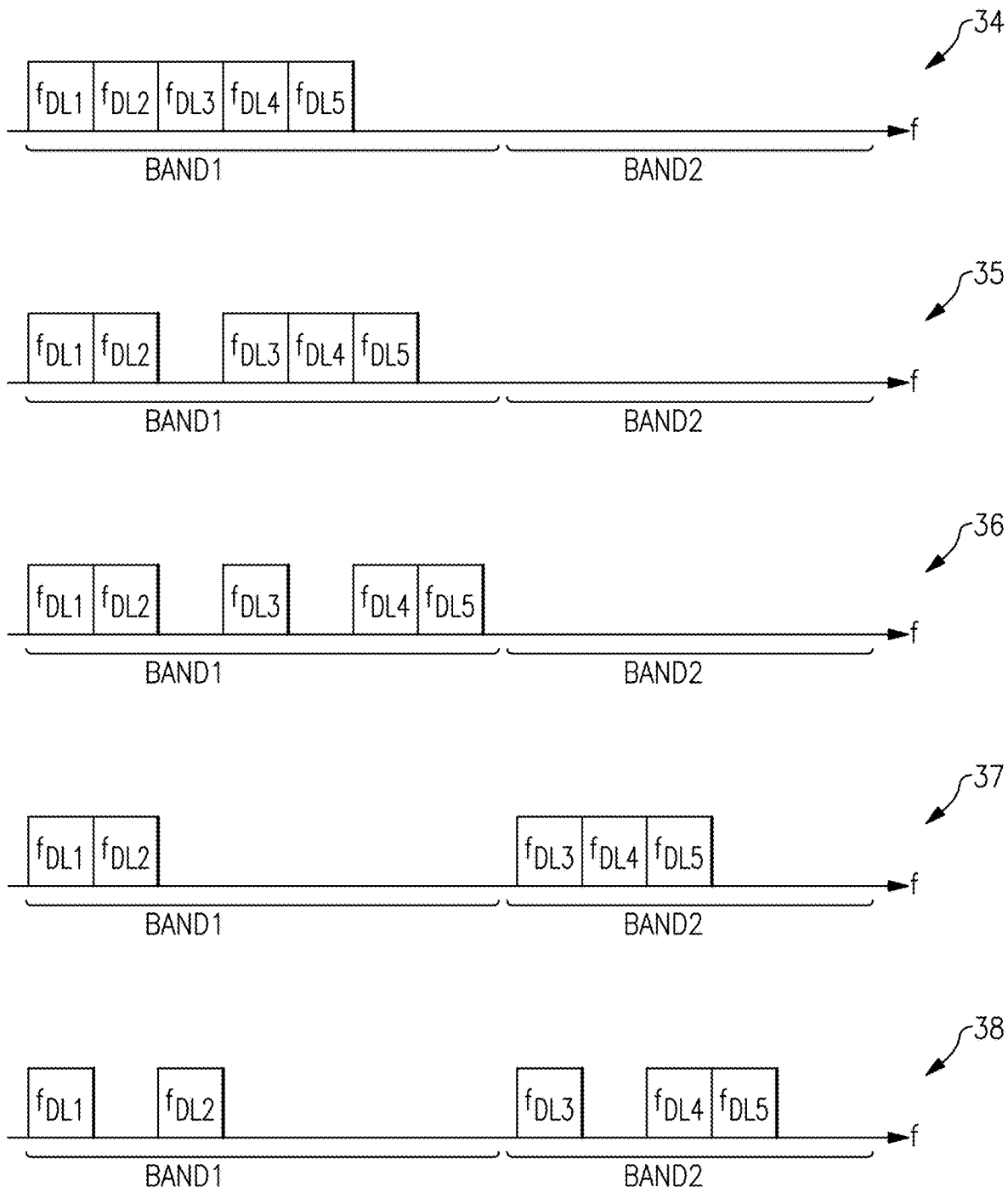
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
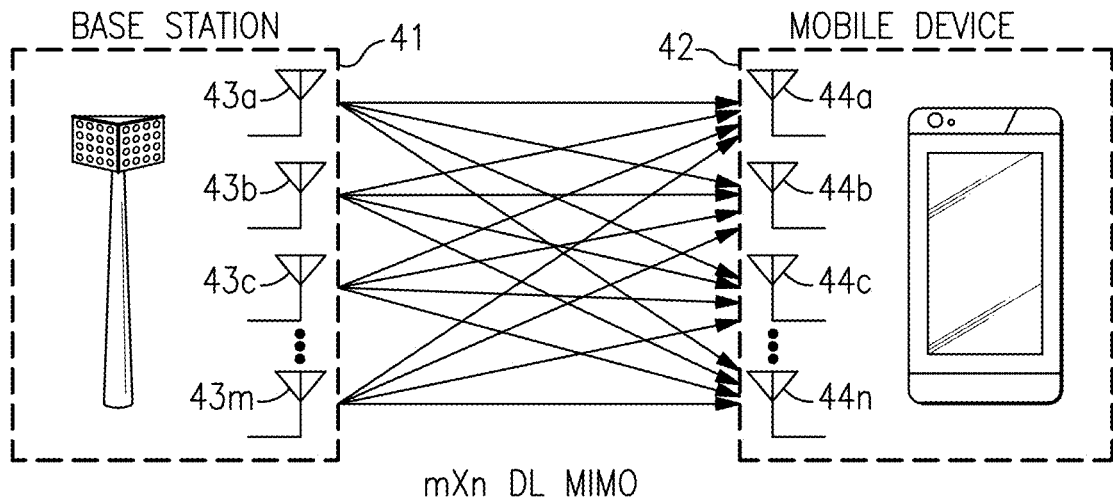
FIG. 3A is a schematic diagram of one example of a downlink channel using multi-input and multi-output (MIMO) communications.
Figure 3B:
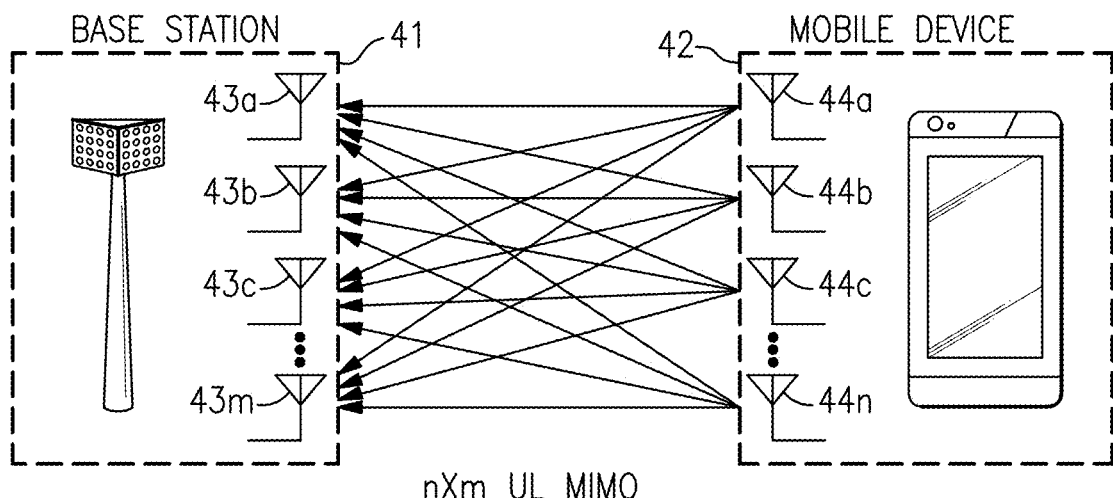
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas $43a$, $43b$, $43c$, . . . $43m$ of the base station $41$ and receiving using N antennas $44a$, $44b$, $44c$, . . . $44n$ of the mobile device $42$. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas $44a$, $44b$, $44c$, . . . $44n$ of the mobile device $42$ and receiving using M antennas $43a$, $43b$, $43c$, . . . $43m$ of the base station $41$. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
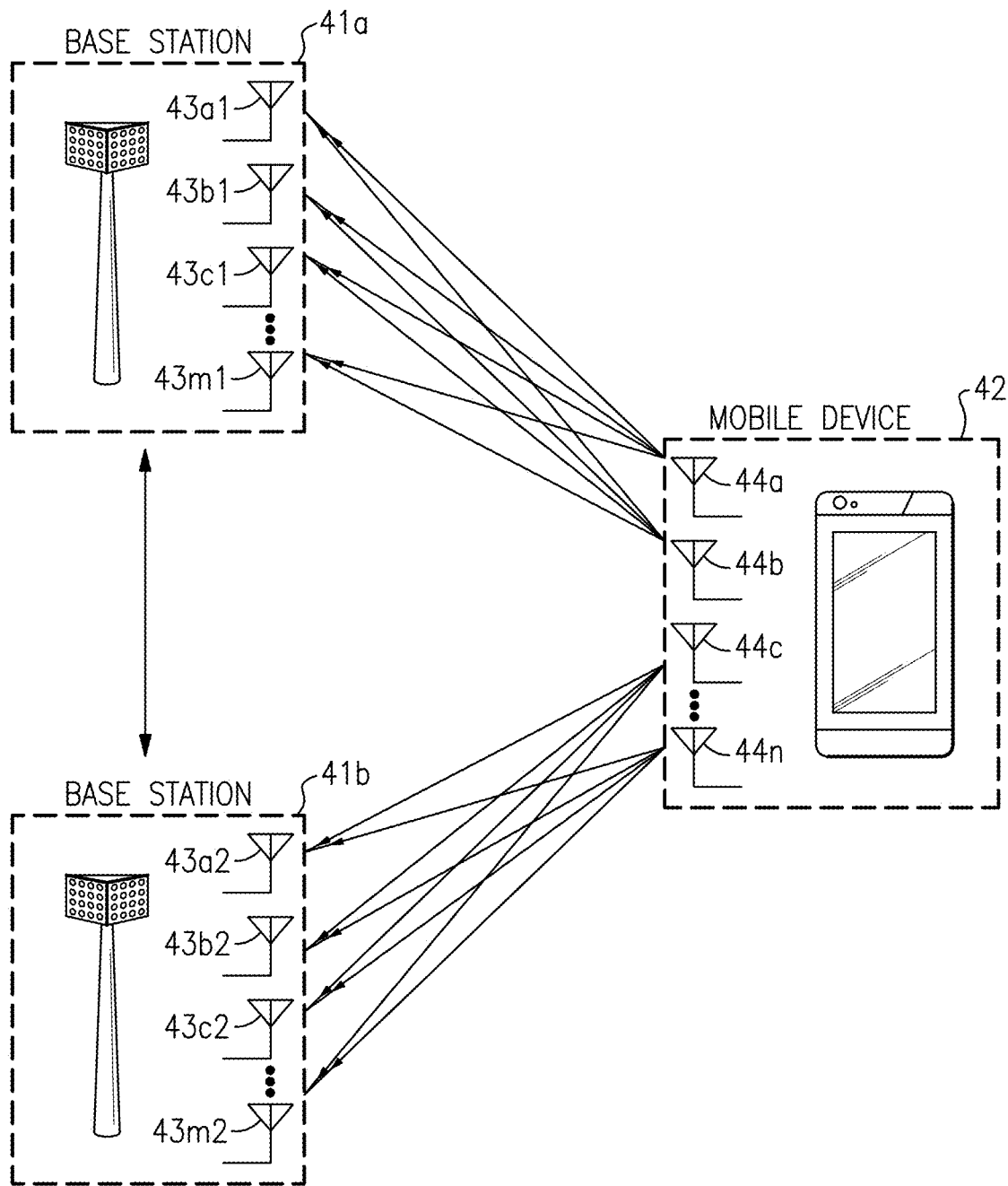
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas $44a$, $44b$, $44c$, . . . $44n$ of the mobile device $42$. Additional a first portion of the uplink transmissions are received using M antennas $43a1$, $43b1$, $43c1$, . . . $43m1$ of a first base station $41a$, while a second portion of the uplink transmissions are received using M antennas $43a2$, $43b2$, $43c2$, . . . $43m2$ of a second base station $41b$. Additionally, the first base station $41a$ and the second base station $41b$ communication with one another over wired, optical, and/or wireless links.

The MIMO scenario of FIG. 3C illustrates an example in which multiple base stations cooperate to facilitate MIMO communications.

With the introduction of the 5G NR air interface standards, 3GPP has allowed for the simultaneous operation of 5G and 4G standards in order to facilitate the transition. This mode can be referred to as Non-Stand-Alone (NSA) operation or E-UTRAN New Radio-Dual Connectivity (EN-DC) and involves both 4G and 5G carriers being simultaneously transmitted from a user equipment (UE).

In certain EN-DC applications, dual connectivity NSA involves overlaying 5G systems onto an existing 4G core network. For dual connectivity in such applications, the control and synchronization between the base station and the UE can be performed by the 4G network while the 5G network is a complementary radio access network tethered to the 4G anchor. The 4G anchor can connect to the existing 4G network with the overlay of 5G data/control.

Figure 4:
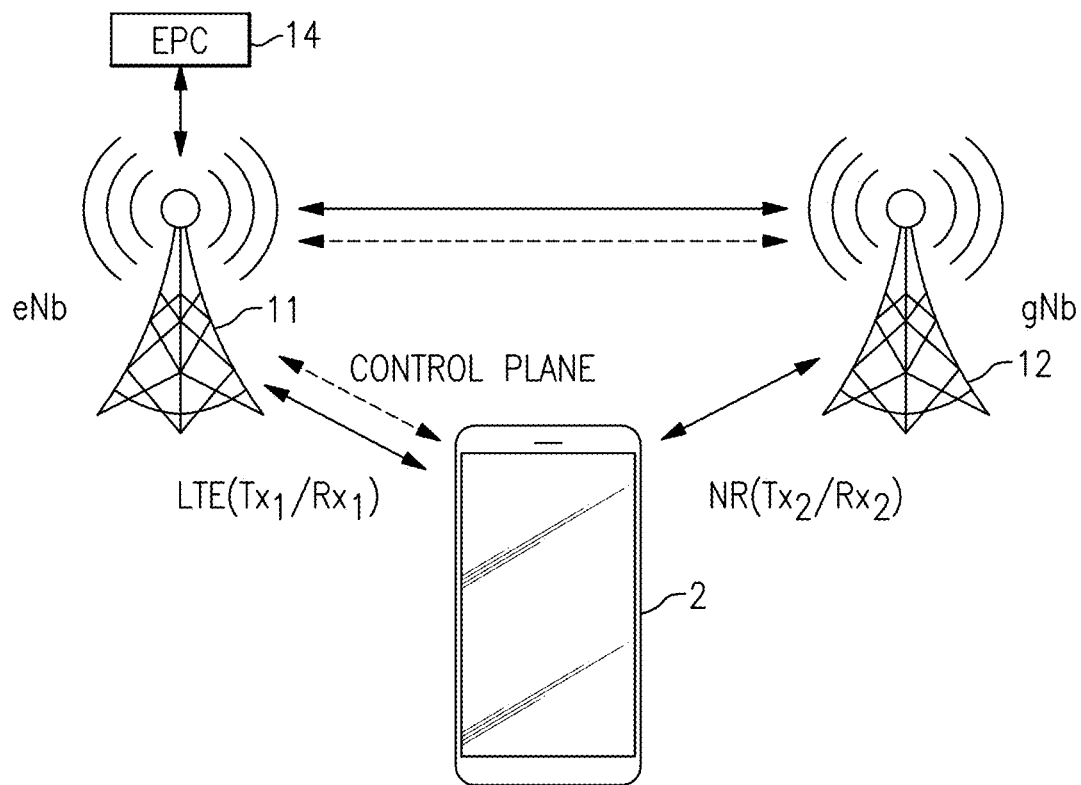
FIG. 4 is a schematic diagram of an example dual connectivity network topology.

FIG. 4 is a schematic diagram of an example dual connectivity network topology. This architecture can leverage LTE legacy coverage to ensure continuity of service delivery and the progressive rollout of 5G cells. A UE 2 can simultaneously transmit dual uplink LTE and NR carrier. The UE 2 can transmit an uplink LTE carrier Tx1 to the eNB 11 while transmitting an uplink NR carrier Tx2 to the gNB 12 to implement dual connectivity. Any suitable combination of uplink carriers Tx1, Tx2 and/or downlink carriers Rx1, Rx2 can be concurrently transmitted via wireless links in the example network topology of FIG. 1. The eNB 11 can provide a connection with a core network, such as an Evolved Packet Core (EPC) 14. The gNB 12 can communicate with the core network via the eNB 11. Control plane data can be wireless communicated between the UE 2 and eNB 11. The eNB 11 can also communicate control plane data with the gNB 12. Control plane data can propagate along the paths of the dashed lines in FIG. 4. The solid lines in FIG. 4 are for data plane paths.

In the example dual connectivity topology of FIG. 4, any suitable combinations of standardized bands and radio access technologies (e.g., FDD, TDD, SUL, SDL) can be wirelessly transmitted and received. This can present technical challenges related to having multiple separate radios and bands functioning in the UE 2. With a TDD LTE anchor point, network operation may be synchronous, in which case the operating modes can be constrained to Tx1/Tx2 and Rx1/Rx2, or asynchronous which can involve Tx1/Tx2, Tx1/Rx2, Rx1/Tx2, Rx1/Rx2. When the LTE anchor is a frequency division duplex (FDD) carrier, the TDD/FDD inter-band operation can involve simultaneous Tx1/Rx1/Tx2 and Tx1/Rx1/Rx2.

As discussed above, EN-DC can involve both 4G and 5G carriers being simultaneously transmitted from a UE. Transmitting both 4G and 5G carriers in a UE, such as a phone, typically involves two power amplifiers (PAs) being active at the same time. Traditionally, having two power amplifiers active simultaneously would involve the placement of one or more additional power amplifiers specifically suited for EN-DC operation. Additional board space and expense is incurred when designing to support such EN-DC/NSA operation.

Power Detection and Clamping for Power Amplifiers

A radio frequency (RF) communication device can include multiple antennas for supporting wireless communications. Additionally, the RF communication device can include a radio frequency front-end (RFFE) system for processing signals received from and transmitted by the antennas. The RFFE system can provide a number of functions, including, but not limited to, signal filtering, signal partitioning and combining, controlling component connectivity to the antennas, and/or signal amplification. Additionally, the RFFE system includes power amplifiers for amplifying RF signals for transmission on the antennas.

RFFE systems can be used to handle RF signals of a wide variety of types, including, but not limited to, wireless local area network (WLAN) signals, Bluetooth signals, and/or cellular signals. RFFE systems are also referred to herein as front-end systems.

RFFE systems can be used to process signals of a wide range of frequencies. For example, certain RFFE systems can operate using one or more low bands (for example, RF signal bands having a frequency content of 1 GHz or less, also referred to herein as LB), one or more mid bands (for example, RF signal bands having a frequency content between 1 GHz and 2.3 GHz, also referred to herein as MB), one or more high bands (for example, RF signal bands having a frequency content between 2.3 GHz and 3 GHz, also referred to herein as HB), and one or more ultrahigh bands (for example, RF signal bands having a frequency content between 3 GHz and 7.125 GHz, also referred to herein as UHB). In certain implementations, modules operate over mid band and high band frequencies (MHB).

RFFE systems can be used in a wide variety of RF communication devices, including, but not limited to, smartphones, base stations, laptops, handsets, wearable electronics, and/or tablets.

An RFFE system can be implemented to support a variety of features that enhance bandwidth and/or other performance characteristics of the RF communication device in which the RFFE system is incorporated.

For example, to support wider bandwidth, an increasing number of uplink carrier aggregation scenarios have been developed to support wider bandwidth. Additionally, the bandwidths for uplink and downlink cannot be arbitrarily sent since there is a minimum uplink bandwidth for maintaining a reliable link supported by the transport layer's ACK/NACK traffic. Thus, in 4G/5G, wideband uplink carrier aggregation should be supported to achieve higher bandwidth for downlink carrier aggregation.

Thus, an RFFE system can be implemented to support both uplink and downlink carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels, for instance up to five carriers. Carrier aggregation includes contiguous aggregation, in which contiguous carriers within the same operating frequency band are aggregated. Carrier aggregation can also be non-contiguous, and can include carriers separated in frequency within a common band or in different bands.

Transition from 4G to 5G is through non-standalone (NSA) operation, rather than directly to full standalone (SA) operation. Current networks operate in 4G and 5G concurrently by communicating with an eNodeB and a gNodeB simultaneously in an EN-DC mode of operation. Thus, 4G and 5G transmitters operate concurrently is such a phone.

To provide such feature support, an RFFE system can be implemented to support EN-DC.

Support for EN-DC can cover a wide range of frequency bands, including using a 4G band in the LB, MHB, HB, or UHB frequency ranges in combination with a 5G band in the LB, MHB, HB, or UHB frequency ranges. Thus, various combinations of EN-DC including, but not limited to, LB-LB EN-DC, MHB-MHB EN-DC, LB-MHB EN-DC, LB-UHB EN-DC, MHB-UHB EN-DC, and UHB-UHB EN-DC, are possible.

Moreover, in certain dual uplink transmission scenarios, it can be desirable to provide flexibility between swapping which antenna transmits a first RF transmit signal (for instance, one of a 4G signal or a 5G signal) on a first side of a phone board assembly and which antenna transmits a second RF transmit signal (for instance, the other of the 4G signal or the 5G signal) on a side of the phone board assembly. To provide such flexibility, an RFFE system can support a transmit swap function to selectively switch which antenna a particular RF transmit signal is transmitted from.

Another technique for increasing uplink capacity is uplink multiple-input multiple-output (MIMO) communications, in which multiple (for instance, two) power amplifiers transmit two different signals simultaneously on the same frequency using different antennas. MIMO communications benefit from higher signal to noise ratio, improved coding, and/or reduced signal interference due to spatial multiplexing differences of the radio environment. MIMO order refers to a number of separate data streams sent or received.

RFFE systems include power amplifiers for amplifying RF transmit signals used in these as well as other applications.

Power amplifiers can receive large RF input signals under certain conditions. For example, a power amplifier can be driven with a large RF input signal in the presence of variation in voltage standing wave ratio (VSWR) and/or temperature.

Although a power amplifier and a downstream filter (for instance, an acoustic wave filter) can be implemented for handling VSWR and temperature variation under normal signaling conditions (for instance, transmitting at a maximum MPR0 power), the power amplifier and/or downstream filter can be damaged under an excess RF input signal drive event. For example, a downstream bulk acoustic wave (BAW) or surface acoustic wave (SAW) filter may be damaged at a certain threshold over MPR0 power (for instance, 3.5 dB higher than maximum rated MPR0 power).

Thus, in applications such as cellular, the power generated by a power amplifier should be monitored and clamped not to exceed a specified value to ensure device reliability, to prevent excessive heat generation, and/or to prolong battery life. Accurately monitoring, measuring, and acting on high signal power as fast as possible is desirable to limit the power level within the RFFE system. Such performance should be for all practical environmental and operating conditions, while simultaneously not degrading other performance metrics such as adjacent channel power ratio.

Apparatus and methods for power detection and clamping of a power amplifier are provided. In certain embodiments, a power amplifier system includes a power amplifier that amplifies an RF input signal to generate an RF output signal, a bias circuit that controls a bias of the power amplifier, an RF coupler that generates an RF coupled signal based on the RF output signal, a clamp that selectively clamps the bias of the power amplifier, and a power detector that controls the clamp based on the RF coupled signal.

By implementing the power amplifier system in this manner, precise power is sensed since the RF coupler provides a well-controlled amount of power coupling back to the power detector. Accordingly, the power detection is highly accurate.

The power detector can serve to convert the RF power indicated by the RF coupled signal (for instance, by rectifying the RF voltage level) to a corresponding DC voltage level, which can be compared to a threshold voltage. Additionally, when the DC voltage level exceeds the threshold voltage, the bias of the power amplifier can be clamped to reduce the power amplifier's gain.

In certain implementations, the threshold of the power detector is programmable to adapt to variation, for instance, using a bias controller implemented with programmability to account for process, voltage, and/or temperature (PVT) variation, frequency band, and/or communication mode (for instance, 4G or 5G). The threshold programming can be specific to a particular deployment scenario of the power amplifier, for instance, whether a SAW or a BAW filter is downstream to account for a suitable limit to peak power and/or average power.

The bias controller can also be used to generate a reference current for the bias circuit, which can also be trimmed to account for PVT variation, frequency band, and/or communication mode. Accordingly, certain implementations herein control both a power detector's threshold and a reference current used for power amplifier biasing.

By implementing the power amplifier with such signal power detection and clamping, improved ruggedness is achieved without incurring degradation in power, efficiency, and/or gain at nominal conditions. Furthermore, such signal limiting protects downstream or post-power amplifier circuitry such as acoustic wave filters. Moreover, the power detection and clamping circuit avoids loading the RF signal input of the power amplifier, and thus provides little to no parasitic loading and corresponding performance degradation at nominal conditions.

Figure 5A:
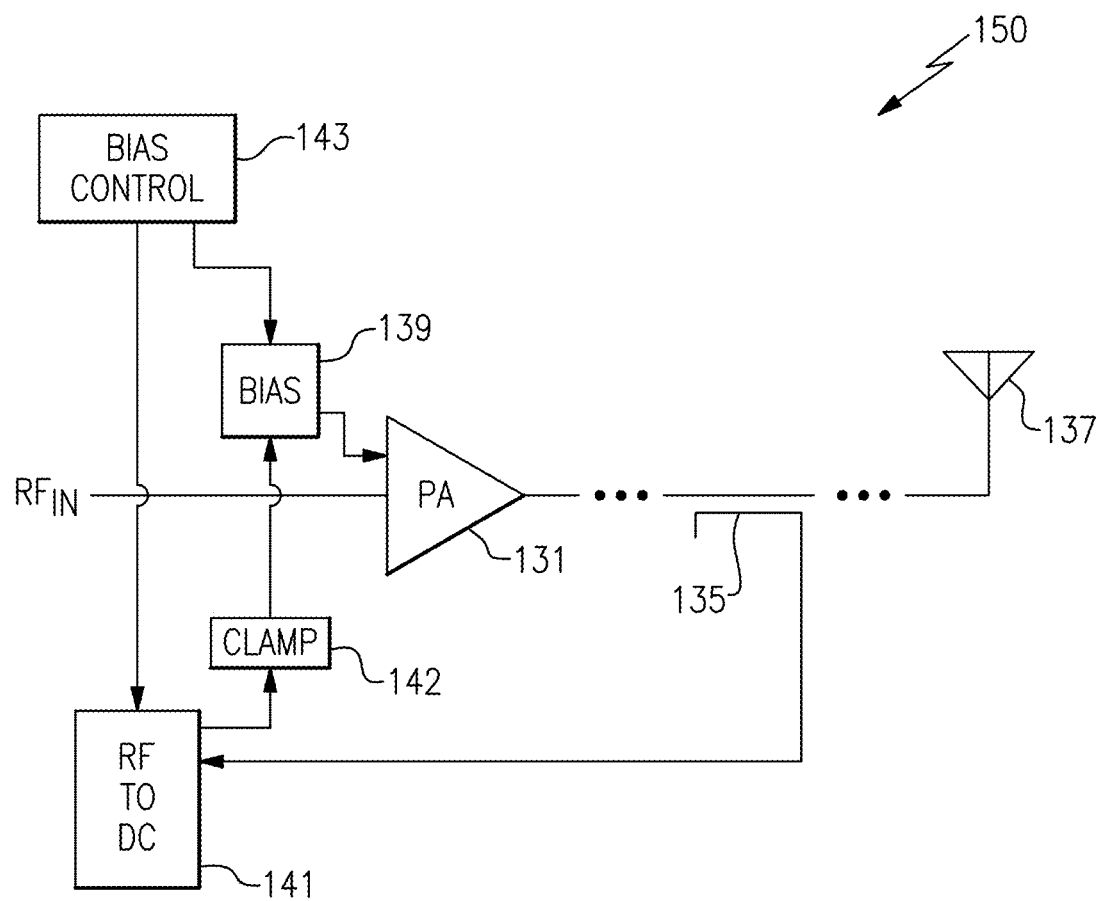
FIG. 5A is a schematic diagram of a power amplifier system with power detection and clamping according to one embodiment.

FIG. 5A is a schematic diagram of a power amplifier system 150 with power detection and clamping according to one embodiment. The power amplifier system 150 includes a power amplifier 131, an RF coupler 135, an antenna 137, a power amplifier bias circuit 139 (also referred to herein as a bias circuit), a power detector 141, a clamp 142, and a bias control circuit 143.

As shown in FIG. 5A, the power amplifier 131 amplifies an RF input signal $RF_{IN}$ to generate an RF output signal that is provided to the antenna 137 along an RF signal path. Additionally, the RF coupler 135 is positioned along a portion of the RF signal path between the output of the power amplifier 131 and the antenna 137, and serves to generate an RF coupled signal that is provided to the power detector 141.

The power amplifier 131 is biased by a bias from the power amplifier bias circuit 139. The bias provide by the power amplifier bias circuit 139 controls a gain of the power amplifier 131.

In the illustrated embodiment, the power detector 141 is an RF to DC detector that converts the RF coupled signal to a DC signal indicating a power level of the RF coupled signal. Additionally, the power detector 141 selectively activates the clamp 142 based on comparing the DC signal to a threshold signal provided by the bias control circuit 143. The bias control circuit 143 also controls a reference signal to the power amplifier bias circuit 139, in this example.

The clamp 142 is used to limit the bias of the power amplifier 131, thereby controlling the power amplifier's gain and thus the output power of the power amplifier 131. Accordingly, both the power amplifier 131 and any downstream components from the power amplifier 131 can be protected.

Figure 5B:
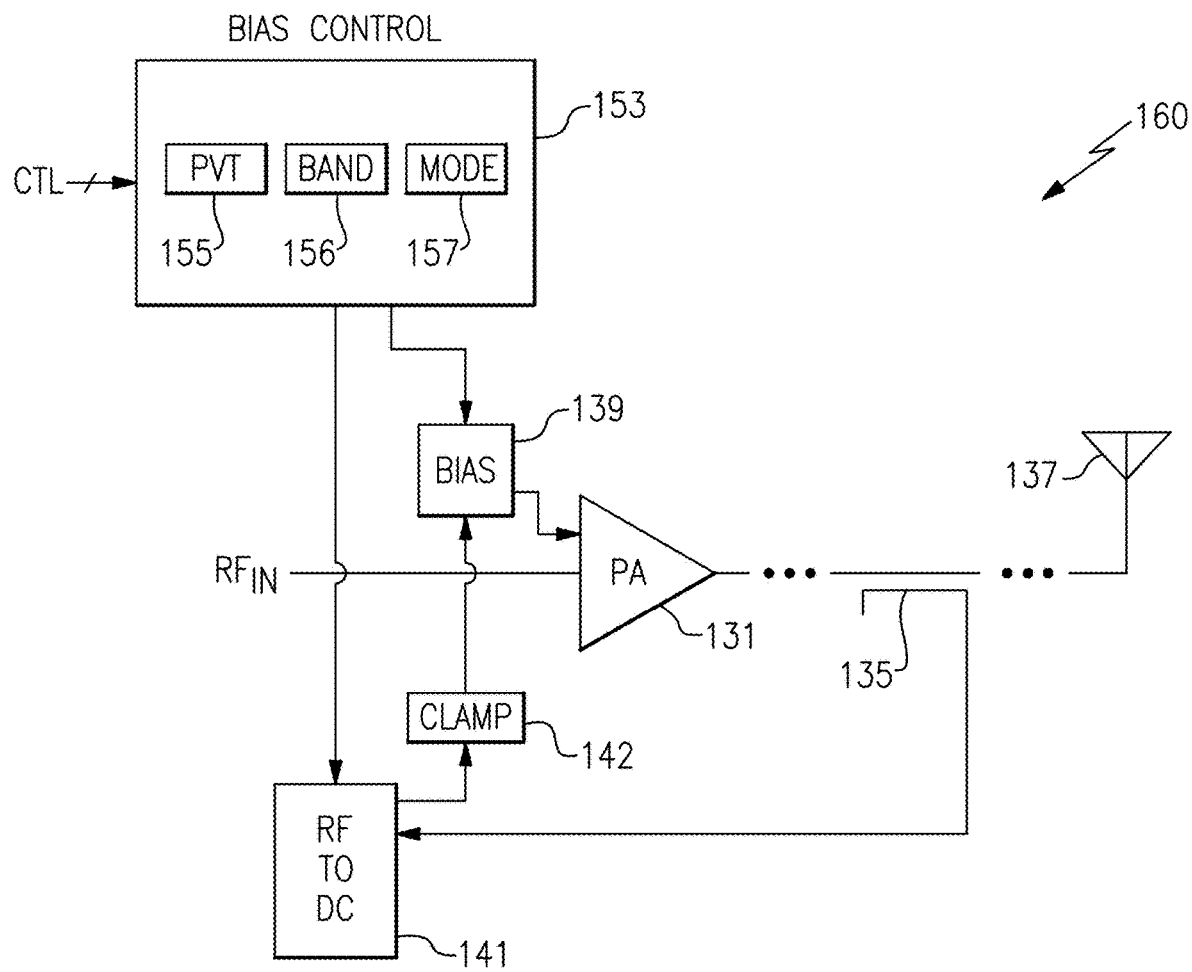
FIG. 5B is a schematic diagram of a power amplifier system with power detection and clamping according to another embodiment.

FIG. 5B is a schematic diagram of a power amplifier system 160 with power detection and clamping according to another embodiment.

The power amplifier system 160 of FIG. 6B is similar to the power amplifier system 150 of FIG. 6A, except that the power amplifier system 160 includes a bias control circuit 153 including programmability for PVT 155, frequency band 156, and/or operating mode 157 (for instance, transmission using 4G or 5G).

The bias control circuit 153 is programmable using a control signal CTL, which can be a multi-bit digital control signal received over a control interface, in certain implementations.

The programmability can be used to dynamically adjust the threshold of the power detector 141 and/or a reference signal to the power amplifier bias circuit 139 to provide compensation for a number of operating conditions, such as PVT 155, frequency band 156, and/or operating mode 157. In such implementations, the threshold and/or the reference signal can change value over time in response to detected changes in such operating conditions. Thus, although not depicted in FIG. 5B, the power amplifier system 160 can include detectors for detecting parameters associated with various operating conditions that are to be compensated for.

Accordingly, performance of the power clamping system can be adjusted to provide enhanced performance desired for particular operating conditions.

Figure 5C:
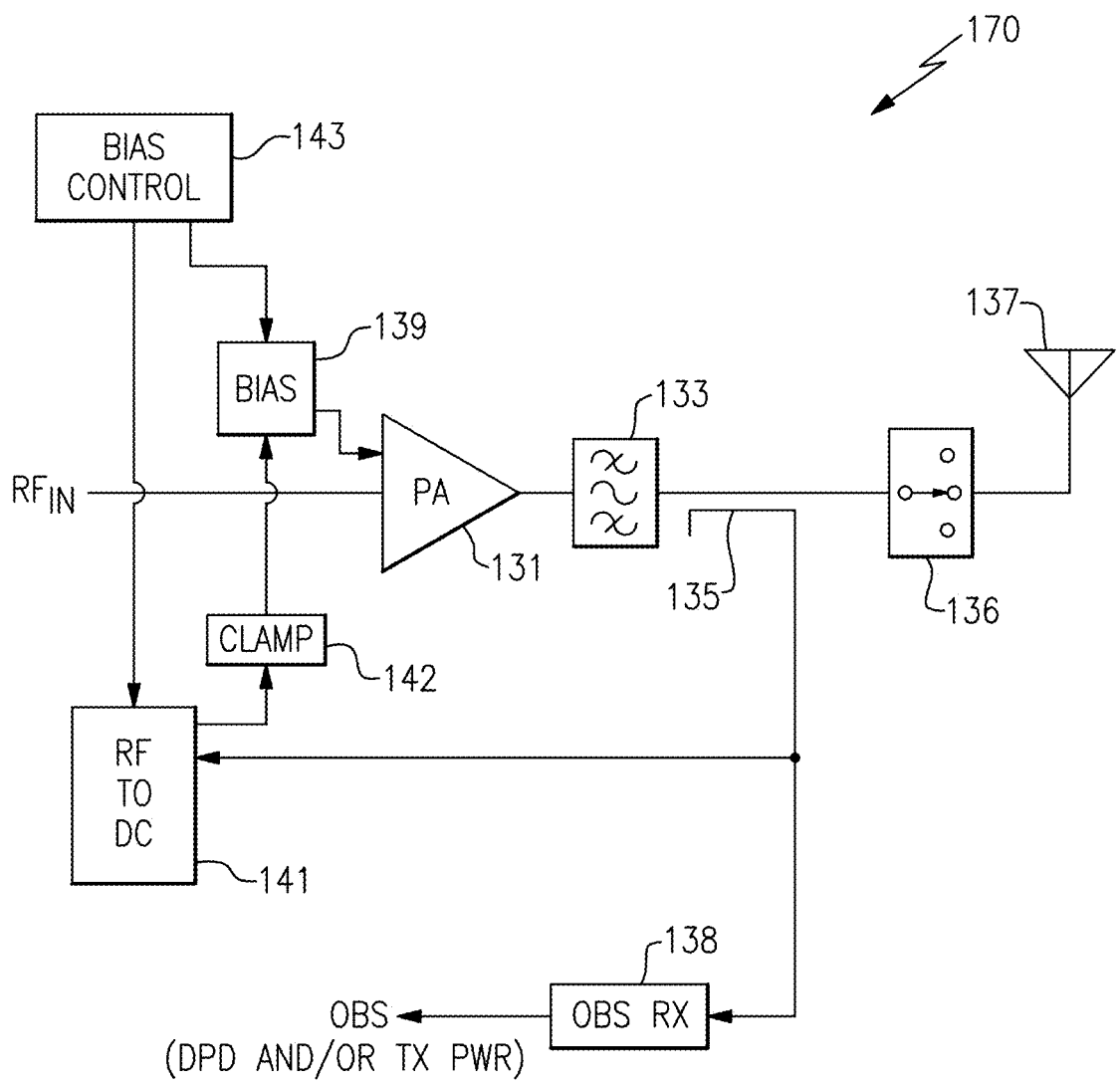
FIG. 5C is a schematic diagram of a power amplifier system with power detection and clamping according to another embodiment.

FIG. 5C is a schematic diagram of a power amplifier system 170 with power detection and clamping according to another embodiment.

The power amplifier system 170 of FIG. 5C is similar to the power amplifier system 150 of FIG. 5A, except that the power amplifier system 170 further includes an acoustic wave filter 133, a switch 136, and an observation receiver 138.

The acoustic wave filter 133 and the switch 136 are example components that can be connected along an RF signal path between a power amplifier's output and an antenna, and that can be damaged by high power signal conditions absent detection and clamping.

In the illustrated embodiment, the observation receiver 138 is also shown an processing the RF coupled signal from the RF coupler 135 to generate an observation signal OBS that is used for digital-pre distortion (DPD) and/or transmit power control (TX PWR). Thus, the RF coupler 135 can be used for other purposes aside from RF power detection and clamping. Accordingly, the RF coupler 135 can be shared for multiple functions.

Figure 6:
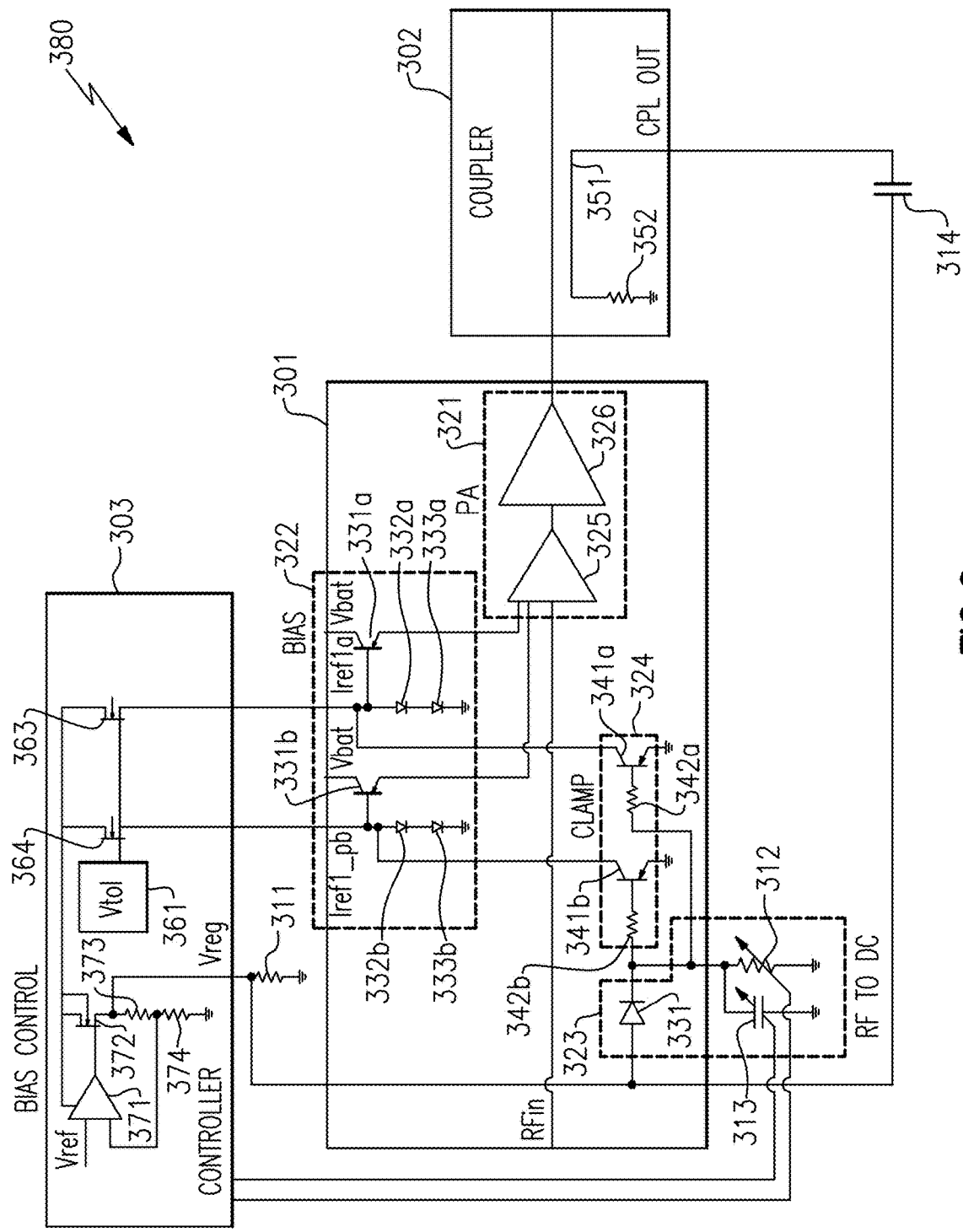
FIG. 6 is a schematic diagram of a power amplifier system with power detection and clamping according to another embodiment.

FIG. 6 is a schematic diagram of a power amplifier system 380 with power detection and clamping according to another embodiment.

The power amplifier system 380 includes a power amplifier die 301, a coupler die 302, a bias control die 303, a threshold setting resistor 311, a controllable low pass filtering capacitor 312, a controllable low pass filtering resistor 313, and a coupling capacitor 314. In certain implementations, the dies and components can be included as semiconductor chips and surface mount devices (SMD) as part of a multi-chip module (MCM).

In the illustrated embodiment, the power amplifier die 301 includes a power amplifier 321, a power amplifier bias circuit 322, and a clamp 324. Additionally, a power detector 323 includes a rectifying diode 331 formed on the power amplifier die 301 as well as the controllable low pass filtering capacitor 312 and the controllable low pass filtering resistor 313 which are implemented as off-chip components, in this embodiment.

The power amplifier 321 amplifies an RF input signal RFin to generate an RF output signal (also referred to herein as an amplified RF signal) provided to the coupler die 302. In this embodiment, the power amplifier 321 includes an input stage 325 and an output stage 326.

With continuing reference to FIG. 6, the power amplifier bias circuit 322 includes a first biasing bipolar transistor 331a (powered by a battery voltage Vbat), a second biasing bipolar transistor 331b (powered by the battery voltage Vbat), a first biasing diode stack 332a/333a (with two series diodes, in this example), and a second biasing diode stack 332b/333b (with two series diodes, in this example). The power amplifier bias circuit 322 operates with two selectable bias circuits that bias the input stage 325 and that can be chosen based on gain setting and/or mode of the power amplifier 321. The first bias circuit includes the first biasing bipolar transistor 331a and the first biasing diode stack 332a/333a, and is selectively activated by a first reference current Iref1a from the bias control circuit 303. Additionally, the second bias circuit includes the second biasing bipolar transistor 331b and the second biasing diode stack 332b/333b, and is activated by a second reference current Iref1b from the bias control circuit 303.

The clamp 324 includes a first resistor 342a and a first clamp bipolar transistor 341a used to clamp the first bias circuit when activated. The clamp 324 further includes a second resistor 342b and a second clamp bipolar transistor 341b used to clamp the second bias circuit when activated.

The coupler die 302 includes a directional coupler 351 and a termination resistor 352. The directional coupler 351 provides a coupled out signal (CPL OUT) to the power detector 323 through the coupling capacitor 314.

In the illustrated embodiment, the bias control circuit 303 includes a current control circuit 361, a first current source field-effect transistor (FET) 363, a second current source FET 364, and a low dropout (LDO) regulator including an amplifier 371 (receiving a reference voltage Vref), a regulation FET 372, a first voltage divider resistor 373, and a second voltage divider resistor 374. The LDO regulator 371 generates a regulated voltage Vreg that is provided to the resistor 311 and to the rectifying diode 331 to serve as a threshold voltage for the power detector 311. By controlling the reference voltage Vref (and/or other suitable parameter such as the ratio of resistances of the voltage divider resistors), the threshold voltage for power detection can be controlled.

As shown in FIG. 6, bias control circuit 303 also controls a low pass filtering characteristic of the power detector 323, for instance, by controlling a capacitance of the controllable low pass filtering capacitor 313 and/or a resistance of the controllable low pass filtering resistor 312. Such low pass filter controls aids in providing DC averaging of the RF signal level over a suitable time scale for a particular power amplifier system (for instance, based on the implementation of the power amplifier and/or the arrangement and/or type of downstream components of the power amplifier).

Figure 7:
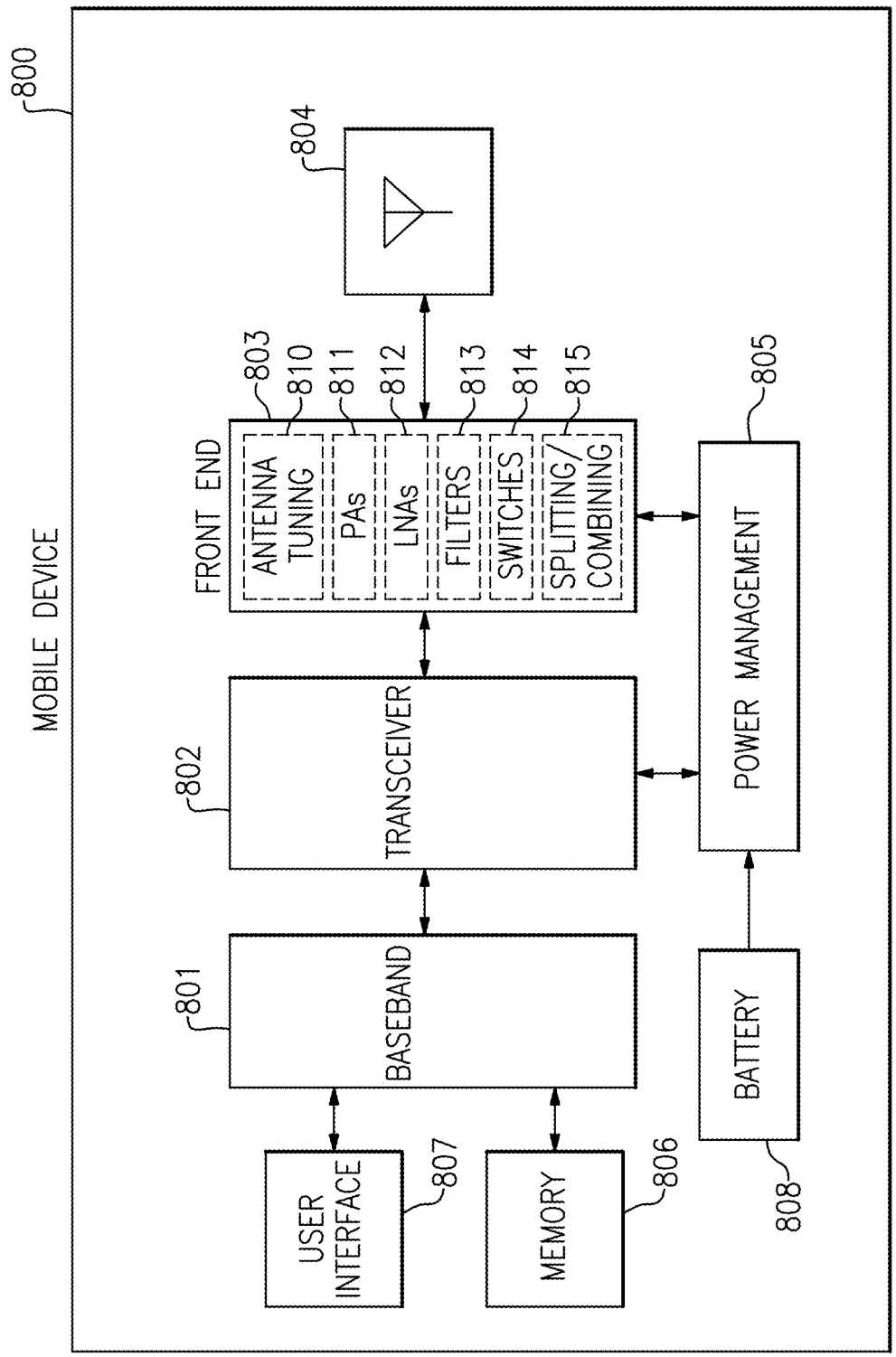
FIG. 7 is a schematic diagram of one embodiment of a mobile device.

FIG. 7 is a schematic diagram of one embodiment of a mobile device 800. The mobile device 800 includes a baseband system 801, a transceiver 802, a front-end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 7 as the transceiver 802. In one example, separate components (for instance, separate circuits or dies) can be provided for handling certain types of RF signals.

The front-end system 803 aids in conditioning signals transmitted to and/or received from the antennas 804. In the illustrated embodiment, the front-end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front-end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front-end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 7, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 7, the power management system 805 receives a battery voltage from the battery 808. The battery 808 can be any suitable battery for use in the mobile device 800, including, for example, a lithium-ion battery.

Figure 8:
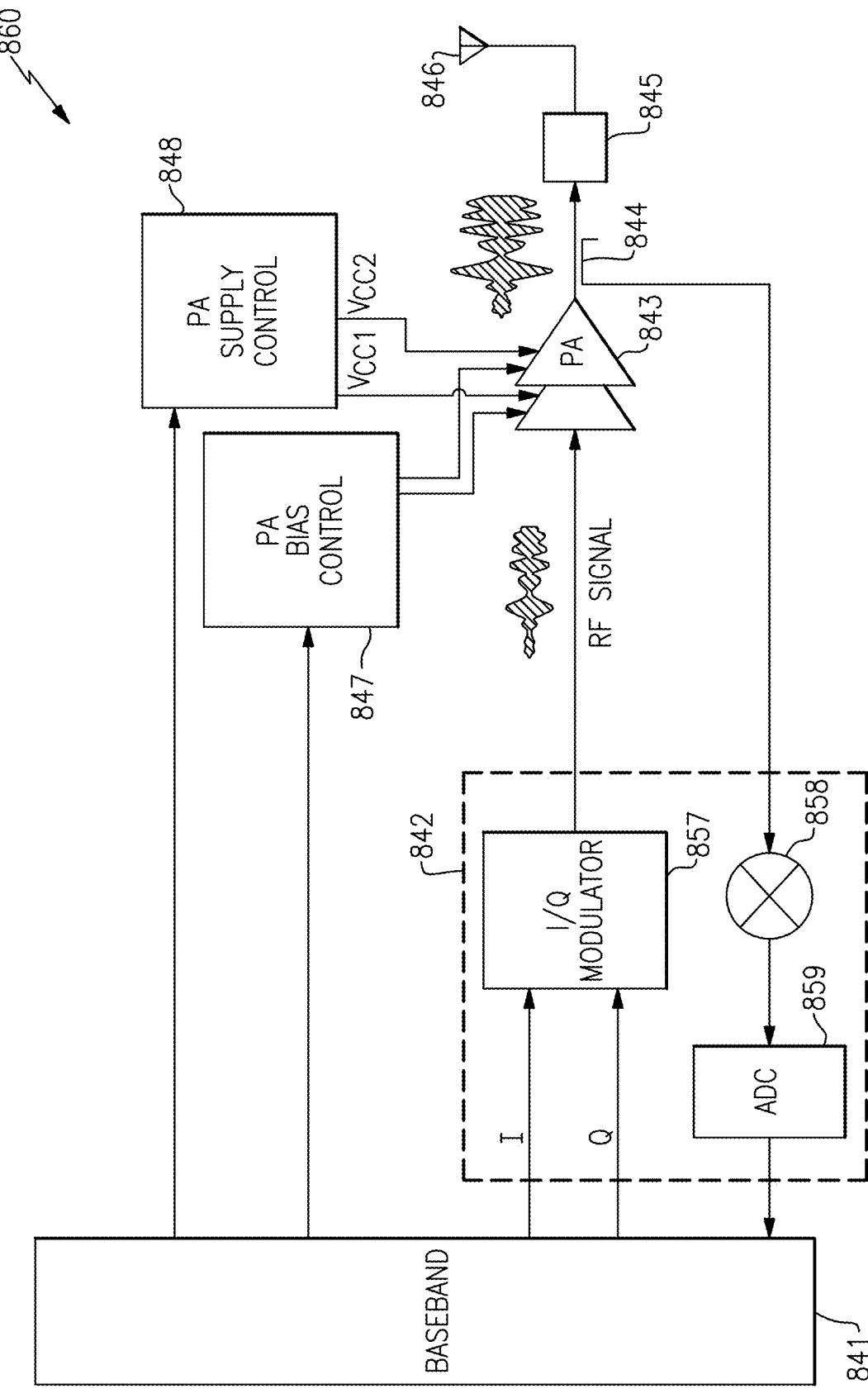
FIG. 8 is a schematic diagram of a power amplifier system according to one embodiment.

FIG. 8 is a schematic diagram of a power amplifier system 860 according to one embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, duplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 8, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Applications

Some of the embodiments described above have provided examples in connection with mobile devices. However, the principles and advantages of the embodiments can be used for any other systems or apparatus that have needs for power amplifiers with power detection and clamping. Examples of such RF communication systems include, but are not limited to, mobile phones, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
a transceiver configured to generate a radio frequency input signal; and
a front-end system including a power amplifier having a signal input configured to receive the radio frequency input signal and a bias input configured to receive a bias signal, the power amplifier configured to amplify the radio frequency input signal to generate a radio frequency output signal, the front-end system further including a bias circuit including a bias bipolar transistor having an emitter configured to generate the bias signal of the power amplifier, the front-end system further including a radio frequency coupler configured to generate a radio frequency coupled signal based on the radio frequency output signal, a clamp configured to selectively clamp the bias signal of the power amplifier by clamping a base of the bias bipolar transistor, and a power detector configured to control the clamp based on the radio frequency coupled signal.

2. The mobile device of claim 1 further comprising an acoustic wave filter electrically connected to an output of the power amplifier.

3. The mobile device of claim 1 further comprising a bias control circuit configured to generate a threshold voltage, the power detector configured to generate a DC power signal based on the radio frequency coupled signal, and to control the clamp based on comparing the DC power signal to the threshold signal.

4. The mobile device of claim 3 wherein the power detector includes a diode configured to generate a rectified signal based on the radio frequency coupled signal, and a low pass filter configured to generate the DC power signal based on low pass filtering the rectified signal.

5. The mobile device of claim 4 wherein at least one of a resistance of the low pass filter or a capacitance of the low pass filter is controlled by the bias control circuit.

6. The mobile device of claim 3 wherein the bias control circuit is further configured to generate a reference current for the bias circuit.

7. The mobile device of claim 3 wherein the bias control circuit is further configured to control the threshold voltage to account for at least one of process, voltage, or temperature variation.

8. The mobile device of claim 3 wherein the bias control circuit is further configured to control the threshold voltage to account for a frequency band of the radio frequency input signal.

9. The mobile device of claim 3 wherein the bias control circuit is further configured to control the threshold voltage to account for a mode of the power amplifier.

10. A power amplifier system comprising:
a power amplifier configured to amplify a radio frequency input signal to generate a radio frequency output signal, the power amplifier having a signal input configured to receive the radio frequency input signal and a bias input configured to receive a bias signal;
a bias circuit including a bias bipolar transistor having an emitter configured to generate the bias signal of the power amplifier;
a radio frequency coupler configured to generate a radio frequency coupled signal based on the radio frequency output signal;
a clamp configured to selectively clamp the bias signal of the power amplifier by clamping a base of the bias bipolar transistor; and
a power detector configured to control the clamp based on the radio frequency coupled signal.

11. The power amplifier system of claim 10 further comprising a bias control circuit configured to generate a threshold voltage, the power detector configured to generate a DC power signal based on the radio frequency coupled signal, and to control the clamp based on comparing the DC power signal to the threshold signal.

12. The power amplifier system of claim 11 wherein the power detector includes a diode configured to generate a rectified signal based on the radio frequency coupled signal, and a low pass filter configured to generate the DC power signal based on low pass filtering the rectified signal.

13. The power amplifier system of claim 12 wherein at least one of a resistance of the low pass filter or a capacitance of the low pass filter is controlled by the bias control circuit.

14. The power amplifier system of claim 11 wherein the bias control circuit is further configured to generate a reference current for the bias circuit.

15. The power amplifier system of claim 11 wherein the bias control circuit is further configured to control the threshold voltage to account for at least one of process, voltage, or temperature variation.

16. The power amplifier system of claim 11 wherein the bias control circuit is further configured to control the threshold voltage to account for a frequency band of the radio frequency input signal.

17. The power amplifier system of claim 11 wherein the bias control circuit is further configured to control the threshold voltage to account for a mode of the power amplifier.

18. A method of power detection and limiting in a power amplifier system, the method comprising:
amplifying a radio frequency input signal to generate a radio frequency output signal using a power amplifier, the power amplifier having a signal input configured to receive the radio frequency input signal and a bias input configured to receive a bias signal;
generating the bias signal of the power amplifier using an emitter of a bias bipolar transistor of a bias circuit;
generating a radio frequency coupled signal based on the radio frequency output signal using a radio frequency coupler;
selectively clamping the bias signal of the power amplifier by using a clamp to clamp a base of the bias bipolar transistor; and
controlling the clamp based on the radio frequency coupled signal using a power detector.

19. The method of claim 18 further comprising generating a DC power signal based on the radio frequency coupled signal using the power detector, and controlling the clamp based on comparing the DC power signal to a threshold signal.

20. The method of claim 18 further comprising processing the radio frequency coupled signal to generate an observation signal using an observation receiver, and processing the observation signal to provide at least one of digital predistortion or power control to the radio frequency input signal.

* * * * *